(12) United States Patent
Zheng et al.

(10) Patent No.: US 11,463,494 B2
(45) Date of Patent: Oct. 4, 2022

(54) BALANCE OF INITIAL FRAME AND LIMITATION OF TRAFFIC

(71) Applicant: Shanghai Bilibili Technology Co., Ltd., Shanghai (CN)

(72) Inventors: Hanchao Zheng, Shanghai (CN); Zhiqiang Wu, Shanghai (CN); Hui Chen, Shanghai (CN)

(73) Assignee: Shanghai Bilibili Technology Co., Ltd., Shanghai (CN)

( * ) Notice: Subject to any disclaimer, the term of this patent is extended or adjusted under 35 U.S.C. 154(b) by 0 days.

(21) Appl. No.: 17/329,716

(22) Filed: May 25, 2021

(65) Prior Publication Data

US 2021/0281624 A1  Sep. 9, 2021

Related U.S. Application Data

(63) Continuation of application No. PCT/CN2019/128418, filed on Dec. 25, 2019.

(30) Foreign Application Priority Data

Jan. 30, 2019 (CN) .......................... 201910092901.0

(51) Int. Cl.
*H04L 65/612* (2022.01)
*H04L 65/65* (2022.01)
(Continued)

(52) U.S. Cl.
CPC .......... *H04L 65/612* (2022.05); *H04L 65/613* (2022.05); *H04L 65/65* (2022.05); *H04L 65/765* (2022.05)

(58) Field of Classification Search
CPC ............. H04L 65/4084; H04L 65/4092; H04L 65/605; H04L 65/608; H04L 65/612; H04L 65/765; H04L 65/613; H04L 65/65
See application file for complete search history.

(56) References Cited

U.S. PATENT DOCUMENTS

| 2003/0156342 A1* | 8/2003 | Yap ........................ G11B 27/10 |
| | | 375/E7.278 |
| 2005/0071881 A1* | 3/2005 | Deshpande .......... H04N 21/443 |
| | | 348/E7.071 |

(Continued)

FOREIGN PATENT DOCUMENTS

| CN | 102724584 A | 10/2012 |
| CN | 104780422 A | 7/2015 |

(Continued)

OTHER PUBLICATIONS

International Patent Application No. PCT/CN2019/128418, International Search Report, dated Mar. 3, 2020, 2 pages.

(Continued)

*Primary Examiner* — Wing F Chan
*Assistant Examiner* — Billy H Ng
(74) *Attorney, Agent, or Firm* — Kilpatrick Townsend & Stockton LLP

(57) ABSTRACT

A method includes: obtaining a video data file and an audio data file of streaming media content to be played from a server, when the streaming media content is played using DASH; obtaining a video bitrate from the video data file, and obtaining an audio bitrate from the audio data file; and determining a capacity of a video buffer area and a capacity of an audio buffer area according to the video bitrate and the audio bitrate.

14 Claims, 2 Drawing Sheets

(51) Int. Cl.
    *H04L 65/613*     (2022.01)
    *H04L 65/75*     (2022.01)

(56) References Cited

U.S. PATENT DOCUMENTS

| | | | | |
|---|---|---|---|---|
| 2007/0195735 | A1* | 8/2007 | Rosen | H04W 76/45 370/335 |
| 2011/0296045 | A1* | 12/2011 | Todd | H04L 65/4084 709/231 |
| 2012/0331106 | A1* | 12/2012 | Ramamurthy | H04N 21/472 709/218 |
| 2013/0262694 | A1* | 10/2013 | Swaminathan | H04N 21/23895 709/231 |
| 2014/0025835 | A1 | 1/2014 | Gahm et al. | |

FOREIGN PATENT DOCUMENTS

| | | |
|---|---|---|
| CN | 106303562 A | 1/2017 |
| CN | 107371061 A | 11/2017 |
| CN | 107438192 A | 12/2017 |
| CN | 107517400 A | 12/2017 |
| WO | 2011031853 A1 | 3/2011 |

OTHER PUBLICATIONS

Extended European Search Report for related EP Application No. 19912992.5, dated Jun. 28, 2022, 10 pages.

* cited by examiner

BALANCE OF INITIAL FRAME AND LIMITATION OF TRAFFIC

CROSS REFERENCE TO RELATED APPLICATION

The present application is a continuation under 35 U.S.C. 111(a) of PCT International Application No. PCT/CN2019/128418, filed on Dec. 25, 2019, which claims priority to Chinese patent application No. 201910092901.0, filed on Jan. 30, 2019, the entire contents of which are hereby incorporated by reference in their entirety for all purposes.

TECHNICAL FIELD

The present application relates to a technical field of audio and video playing, and particularly to a balance of initial frame and limitation of traffic.

BACKGROUND

With the continuous development of Internet and smart terminals, more and more users choose to use smart terminals (such as mobile phones and computers) to play audio, video and other streaming media; users can obtain video contents and audio contents from network servers through smart terminals, and play them on the smart terminal.

SUMMARY

One aspect of the present application provides a method, including:
obtaining a video data file and an audio data file of streaming media content to be played from a server, when the streaming media content is played using Dynamic Adaptive Streaming over HTTP (DASH);
obtaining a video bitrate from the video data file, and obtaining an audio bitrate from the audio data file; and
determining a capacity of a video buffer area and a capacity of an audio buffer area according to the video bitrate and the audio bitrate.

Another aspect of the present application further provides a computing device, including: one or more processors; a memory storing one or more programs configured to be executed by the one or more processors, the one or more programs comprising instructions for:
obtaining a video data file and an audio data file of streaming media content to be played from a server, when the streaming media content is played using Dynamic Adaptive Streaming over HTTP (DASH);
obtaining a video bitrate from the video data file, and obtaining an audio bitrate from the audio data file; and
determining a capacity of a video buffer area and a capacity of an audio buffer area according to the video bitrate and the audio bitrate.

Another aspect of the present application further provides a non-transitory computer-readable storage medium, storing one or more programs comprising instructions that, when executed by one or more processors of a computing device, cause the computing device to perform operations including:
obtaining a video data file and an audio data file of streaming media content to be played from a server, when the streaming media content is played using Dynamic Adaptive Streaming over HTTP (DASH);
obtaining a video bitrate from the video data file, and obtaining an audio bitrate from the audio data file; and
determining a capacity of a video buffer area and a capacity of an audio buffer area according to the video bitrate and the audio bitrate.

BRIEF DESCRIPTION OF THE DRAWINGS

Upon reading the detailed description of some embodiments below, various other advantages and benefits will become apparent to those of ordinary skill in the art. The drawings are only for the purpose of illustrating some embodiments and are not to be considered as limiting the present application. Moreover, the same reference numerals are used throughout the drawings to refer to the same parts. In the drawings.

DETAILED DESCRIPTION OF EMBODIMENTS

To make the embodiments and advantages of the present application more comprehensible, the present application is described in further detail below with reference to embodiments and the accompanying drawings. It should be understood that the specific embodiments described herein are merely used for explaining the present application, and are not intended to limit the present application. All other embodiments obtained by those skilled in the art based on the embodiments of the present application without creative efforts shall fall within the protection scope of the present application.

The inventors recognized that, when playing audio, video, and other streaming media, how to quickly obtain an initial frame content and rapidly start playing has become a technical problem to be solved.

According to some embodiments, the method of balancing initial frame and limiting traffic provided by the present application is described below with reference to the accompanying drawings.

Figure 1:
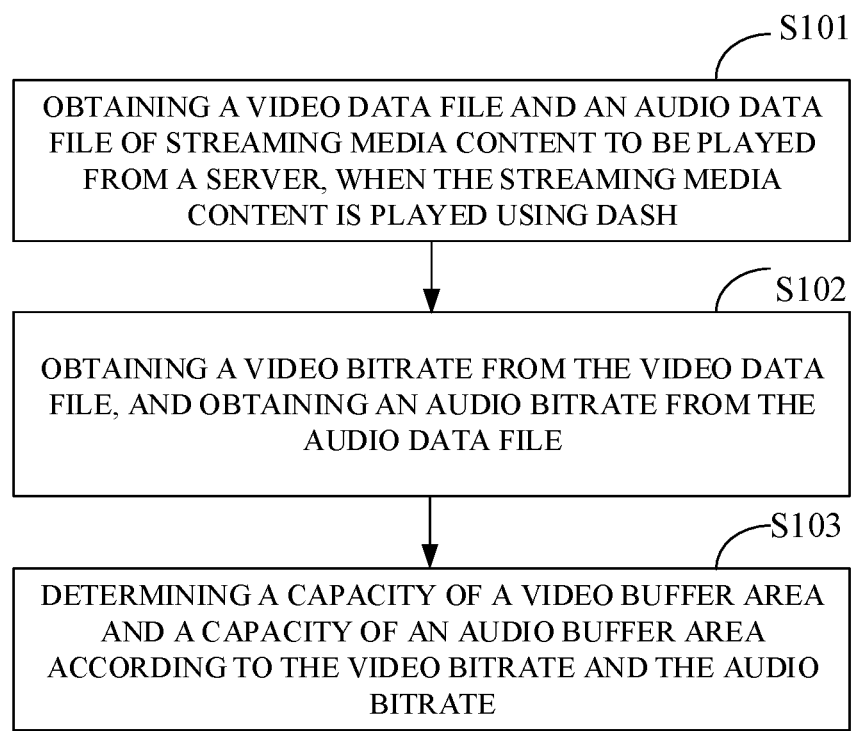
FIG. 1 illustrates a flowchart of a method of balancing initial frame and limiting traffic according to some embodiments.

FIG. 1 illustrates a flowchart of a method of balancing initial frame and limiting traffic according to some embodiments, and the method is applied to a DASH client, as shown in FIG. 1, the method includes the following steps:

Step S101, obtaining a video data file and an audio data file of streaming media content to be played from a server, when the streaming media content is played using DASH.

DASH (Dynamic Adaptive Streaming over HTTP) is an adaptive bitrate streaming technology that enables high-quality streaming media to be delivered over the Internet through a traditional HTTP web server. In related audio and video playing technologies, audio content and video content are contained in one streaming media file, and the client obtains the streaming media file from the server and performs audio and video playing through parsing the streaming media file. However in DASH technology, the audio content and the video content are separated, and the client needs to obtain video data files and audio data files separately from the server and perform audio and video playing through parsing the video data files and audio data files. In addition, DASH splits streaming media content into multiple segments, each of the segments contains a playable content of a certain length (for example, 10 seconds), and each of the segments is corresponding to multiple definitions for using, and a client can choose to download and play the segments with a given code streaming according to current network conditions. Compared with related audio and video playing technologies, streaming media content of different code streaming can be switched at any time during playing streaming media content using DASH technology.

Specifically, the step S101 includes:

sending a request to obtain the video data file and the audio data file to a server, and receiving the video data file and the audio data file returned by the server.

Step S102, obtaining a video bitrate from the video data file and obtaining an audio bitrate from the audio data file.

Specifically, the step S102 includes:

parsing the video data file to obtain video bitrate information in a file header area; and parsing the audio data file to obtain audio bitrate information in a file header area.

In practical applications, the video bitrate of the video content is ten times of the audio bitrate of the audio content, for example, the video bitrate of the video content is 2 MB/s and the audio bitrate of the audio content is 200 kB/s.

Step S103, determining a capacity of a video buffer area and a capacity of an audio buffer area according to the video bitrate and the audio bitrate.

The video buffer area is a preset memory for buffering video content, and the audio buffer area is a preset memory for buffering audio content. In some embodiments, the capacity of both the video buffer area and audio buffering can be adjusted dynamically.

The method of balancing initial frame and limiting traffic can improve downloading speed of downloading video content, and achieve to rapidly start playing, thereby improving user's experience.

Specifically, in step S103, the capacity of the video buffer area and the capacity of the audio buffer area can be determined by one of the following two ways.

The first way includes:

calculating a first capacity required to play a first preset number of video frames according to the video bitrate, and selecting the first capacity as the capacity of the video buffer area; and calculating a second capacity required to play the first preset number of audio frames according to the audio bitrate, and selecting the second capacity as the capacity of the audio buffer area.

According to some embodiments, a capacity required to play the initial two frames of video content calculated according to the video code stream and a capacity required to play the initial two frames of audio content calculated according to the audio bitrate are respectively regarded as the capacity of the video buffer area and the capacity of the audio buffer area.

Since in the process of playing audio and video using DASH, audio and video are played with the frame as the minimum unit, that is, when a frame of the video content is completed buffering, the frame of the video content is played. Therefore, in some embodiments, to achieve the technical effect of quickly starting playing, the capacity required to play the initial two frames of video content and the capacity required to play the initial two frames of audio content are respectively regarded as the initial capacity of the video buffer area and the initial capacity of the audio buffer area. It should be noted that, to achieve the technical effect of quickly starting playing, in some embodiments, the capacity of the initial video buffer area and the capacity of the initial audio buffer area are determined to be the minimum value. Since the video bitrate is much larger than the audio bitrate, the determined capacity of the video buffer area will also be much larger than the determined capacity of the audio buffer area, which causes the video content to occupy more bandwidth during a buffering process, and enables the same number of frames of video content and audio content to be downloaded in the same time.

The second way includes:

determining a proportion of audio and video bitrate according to the video bitrate and the audio bitrate, and dividing a preset total capacity of initial buffering into the capacity of the video buffer area and the capacity of the audio buffer area according to the proportion of audio and video bitrate.

It should be noted that the inventors understand that the capacity of the video buffer area and the capacity of the audio buffer area are usually determined to be the same, for example, the capacity of the video buffer area and the capacity of the audio buffer area are separately determined to be 2 MB. Therefore, video content and audio content occupy the same bandwidth during the buffering process, resulting that in the same downloading time, the buffered audio content is much larger than the buffered audio content. In addition, in the prior art, the capacity of the video buffer area and the capacity of the audio buffer area are stable.

In some embodiments, the preset total capacity of initial buffering is divided according to the proportion of the video bitrate and the audio bitrate. For example, if the proportion of the video bitrate to the audio bitrate is 10:1, the preset total capacity of initial buffering is divided into two parts according to the proportion of 10:1, and the capacity of one part is 10 times the capacity of the other part. In addition, the total capacity of initial buffering is limited so that the initial capacity of the video buffer area and the initial capacity of the audio buffer area can buffer initial frame of video content and initial frame of audio content, thereby achieving the effect of quickly outputting the initial frame of the streaming media content.

In some embodiments, no matter which of the above methods is adopted, the capacity of the video buffer area and the capacity of the audio buffer area are configured according to a proportional relationship between the video bitrate and the audio bitrate, so that the capacity of the video buffer area is larger than the capacity of the audio buffer area. Since bandwidth cannot be allocated directly, an effect of allocating more bandwidth to buffering video content can be achieved through a difference among the capacity of buffer areas. In addition, the capacity of the video buffer area initially configured and the audio buffer area initially configured are reduced, thereby quickly outputting the initial frame of the streaming media content.

According to some embodiments, the method further includes: after determining a capacity of a video buffer area and a capacity of an audio buffer area:

in a process of playing the streaming media content, whenever a second preset number of video frames are played, doubling the capacity of the video buffer area until the capacity of the video buffer area reaches to be half of a preset total capacity of the maximum buffering; and whenever a second preset number of audio frames are played, doubling the capacity of the audio buffer area until the capacity of the audio buffer area reaches to be half of the preset total capacity of the maximum buffering.

According to some embodiments, the capacity of the video buffer area is doubled after every 10 frames of video content is played until the capacity of the video buffer area reaches to be 2 MB; and the capacity of the audio buffer area is doubled after every 10 frames of audio content is played until the capacity of the audio buffer area reaches to be 2 MB.

In some embodiments, in the process of playing audio and video, the capacity of the audio buffer area and the capacity of the video buffer area are dynamically enlarged. Thorough increasing the capacity of the audio buffer area and the capacity of the video buffer area, the number of buffering requests can be reduced and network congestion can be avoided.

According to some embodiments, the method further includes: after determining a capacity of a video buffer area and a capacity of an audio buffer area:

obtaining an initial frame of the video data file in the streaming media content, and buffering the initial frame of the video data file in the video buffer area; and obtaining an initial frame of the audio data file in the streaming media content, and buffering the initial frame of the audio data file in the audio buffer area.

In some embodiments, after the initial frame of audio content is buffered in the audio buffer area and the initial frame of video content is buffered in the video buffer area, the initial frame of audio content and the initial frame of video content can be played synchronously to perform starting playing of audio and video. Since only the initial frame of audio content and the initial frame of video content are required to be quickly played synchronously during the starting playing, the capacity of the audio buffer area used to buffer the initial frame of audio content and the capacity of the video buffer area used to buffer the initial frame of video content are not required to be set too large. In the process of playing of audio and video, the capacity of the audio buffer area and the capacity of the video buffer area are gradually enlarged.

Figure 2:
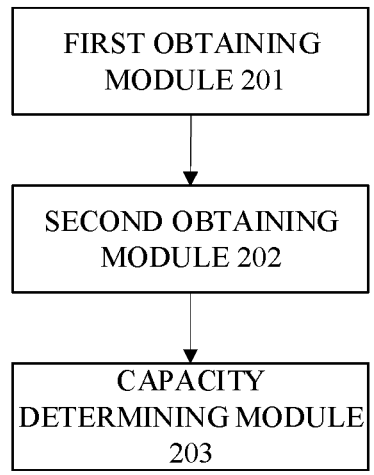
FIG. 2 illustrates a schematic diagram of a program module of a device of balancing initial frame and limiting traffic according to some embodiments.

According to some embodiments, a device of balancing initial frame and limiting traffic is provided, based on the method of balancing initial frame and limiting traffic according to some embodiments. Specifically, FIG. 2 illustrates a schematic diagram of a program module of a device of balancing initial frame and limiting traffic according to some embodiments. The device of balancing initial frame and limiting traffic is divided into one or more program modules, and the one or more program modules are stored in a storage medium and executed by one or more processors to complete the present application. The program modules referred to in the application refer to a series of computer-readable instruction segments capable of performing specific functions, the following description will specifically introduce the functions of each program module in some embodiments.

As shown in FIG. 2, the device of balancing initial frame and limiting traffic applied to a DASH client includes:

a first obtaining module 201, obtaining a video data file and an audio data file of streaming media content to be played from a server, when the streaming media content is played using DASH.

Specifically, the first obtaining module 201 is for:

sending a request to obtain the video data file and the audio data file to a server, and receiving the video data file and the audio data file returned by the server.

As shown in FIG. 2, the device of balancing initial frame and limiting traffic applied to a DASH client includes:

a second obtaining module 202, obtaining a video bitrate from the video data file, and obtaining an audio bitrate from the audio data file.

Specifically, the second obtaining module 202 is for:

parsing the video data file to obtain video bitrate information in a file header area; and parsing the audio data file to obtain audio bitrate information in another file header area.

As shown in FIG. 2, the device of balancing initial frame and limiting traffic applied to a DASH client includes:

a capacity determining module 203, determining a capacity of a video buffer area and a capacity of an audio buffer area according to the video bitrate and the audio bitrate.

The video buffer area is a preset memory for buffering video content, and the audio buffer area is another preset memory for buffering audio content. In some embodiments, the capacity of the video buffer area and audio buffering can be adjusted dynamically.

Specifically, the capacity determining module 203 is for:

calculating a first capacity required to play a first preset number of video frames according to the video bitrate, and selecting the first capacity as the capacity of the video buffer area; and calculating a second capacity required to play the first preset number of audio frames according to the audio bitrate, and selecting the second capacity as the capacity of the audio buffer area; or determining a proportion of audio and video bitrate according to the video bitrate and the audio bitrate, and dividing a preset total capacity of initial buffering into the capacity of the video buffer area and the capacity of the audio buffer area according to the proportion of audio and video bitrate.

According to some embodiments, the device further includes:

a dynamic adjustment module, after determining a capacity of a video buffer area and a capacity of an audio buffer area, in a process of playing the streaming media content, whenever a second preset number of video frames are played, doubling the capacity of the video buffer area until the capacity of the video buffer area reaches to be half of a preset total capacity of the maximum buffering; and whenever a second preset number of audio frames are played, doubling the capacity of the audio buffer area until the capacity of the audio buffer area reaches to be half of the preset total capacity of the maximum buffering.

According to some embodiments, the device further includes:

a buffering obtaining module, after determining a capacity of a video buffer area and a capacity of an audio buffer area, obtaining an initial frame of the video data file in the streaming media content, and buffering the initial frame of the video data file in the video buffer area, and obtaining an initial frame of the audio data file in the streaming media content, and buffering the initial frame of the audio data file in the audio buffer area.

Figure 3:
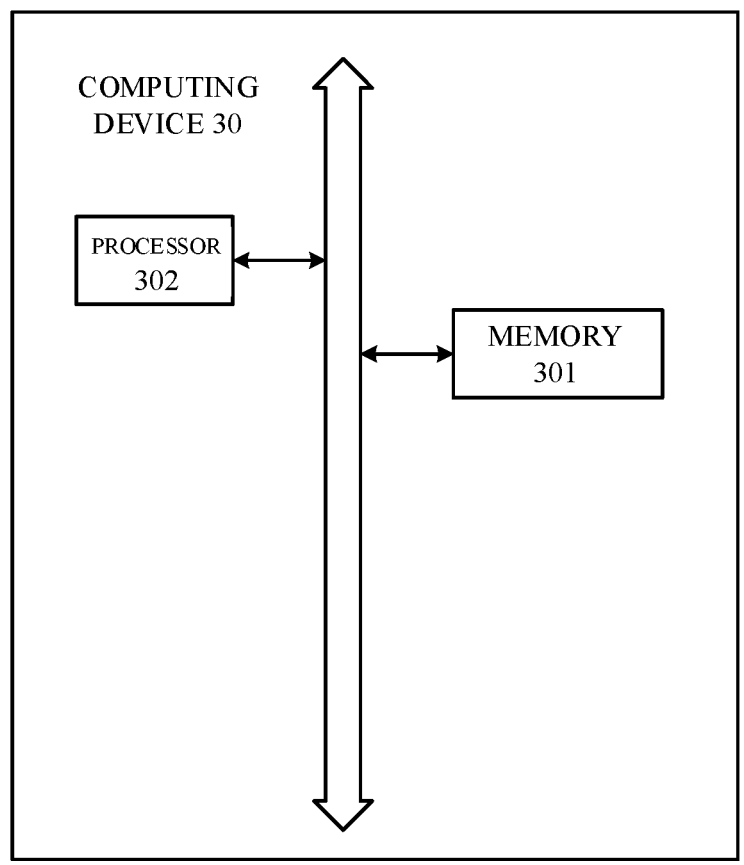
FIG. 3 illustrates a diagram of hardware architecture of a computing device according to some embodiments.

According to some embodiments, a computing device is provided. In some embodiments, the computing device may include but not limit to at least one of: a smartphone, a tablet computer, a notebook computer, a desktop computer, a rack server, a blade server, a tower server, or a rack server (including a stand-alone server, or server cluster consisting of multiple servers), and so on that can execute programs. As shown in FIG. 3, the computing device 30 of the embodiment includes at least, but not limited to: a memory 301 and a processor 302 that can be communicatively connected to each other through a system bus. It should be noted that FIG. 3 only shows the computing device 30 having the components 301 and 302, but it should be understood that not all components shown are required to be implemented, and more or fewer components may be implemented instead.

In some embodiments, the memory 301 (i.e., a readable storage medium) includes a flash memory, a hard disk, a multimedia card, a card-type memory (such as SD or DX memory and so on), a random access memory (RAM), a static random access memory (SRAM), a read-only memory (ROM), an electrically erasable programmable read-only memory (EEPROM), a programmable read-only memory (PROM), magnetic memory, magnetic disks, optical disks and so on. In some embodiments, the memory 301 may be an internal storage unit of the computing device 30, such as a hard disk or a memory of the computing device 30. In other embodiments, the memory 301 may also be an external storage device of the computing device 30, such as a plug-in hard disk, a smart media card (SMC), and a Secure Digital (SD) card, a Flash Card and so on. Of course, the memory 301 may also include both the internal storage unit of the computing device 30 and its external storage device. In some embodiments, the memory 301 is generally used to store an operating system and various types of application software installed in the computing device 30, such as program codes of the device of balancing initial frame and limiting traffic according to some embodiments as described above. In addition, the memory 301 can also be used to temporarily store various types of data that have been output or will be output.

The processor 302 may be a Central Processing Unit (CPU), a controller, a microcontroller, a microprocessor, or other data processing chips in some embodiments. The processor 302 is generally used to control the overall operation of the computing device 30.

Specifically, in some embodiments, the processor 302 is configured to execute a program of a method of balancing initial frame and limiting traffic stored in the processor 302, and when the program of the method of balancing initial frame and limiting traffic is executed, the following steps are implemented:

obtaining a video data file and an audio data file of streaming media content to be played from a server, when the streaming media content is played using DASH;

obtaining a video bitrate from the video data file, and obtaining an audio bitrate from the audio data file; and determining a capacity of a video buffer area and a capacity of an audio buffer area according to the video bitrate and the audio bitrate.

Some specific embodiments and process of the foregoing method steps can refer to the corresponding embodiments as described above, which are not repeatedly described herein.

According to some embodiments, a non-transitory computer-readable storage medium (volatile or nonvolatile) is provided. In some embodiments, the non-transitory computer-readable storage medium may include but not limit to at least one of: a flash memory, a hard disk, a multimedia card, a card-type memory (for example, SD or DX memory and so on), a random access memory (RAM), a static random access memory (SRAM), a read-only memory (ROM), an electrically erasable programmable read-only memory (EEPROM), a programmable read-only memory (PROM), a magnetic memory, magnetic disks, optical disks, servers, App Store and so on, which stores computer-readable instructions that upon execution by a processor cause the processor to implement the following steps:

obtaining a video data file and an audio data file of streaming media content to be played from a server, when the streaming media content is played using DASH;

obtaining a video bitrate from the video data file, and obtaining an audio bitrate from the audio data file; and determining a capacity of a video buffer area and a capacity of an audio buffer area according to the video bitrate and the audio bitrate.

Some specific embodiments and process of the foregoing method steps can refer to the corresponding embodiments as described above, which are not repeatedly described herein.

The method and device of balancing initial frame and limiting traffic, a computing device, and a readable storage medium provided in the present application can configure the capacity of the video buffer area and the capacity of the audio buffer area according to the proportional relationship between the video bitrate and the audio bitrate, so that the capacity of the video buffer area is larger than the capacity of the audio buffer area, which causes the video content to occupy more bandwidth during a buffering process, improves the downloading speed of downloading video content, and enables the same number of frames of video content and audio content to be downloaded in the same time. In addition, the capacity of the initial buffer area is limited so that a capacity of the initial video buffer area and a capacity of the initial audio buffer area can buffer the initial frame of video content and to initial frame of audio content, thereby achieving an effect of quickly outputting the initial frame of the streaming media content. In the process of playing audio and video, the capacity of the audio buffer area and the capacity of the video buffer area are dynamically enlarged. Through increasing the capacity of the audio buffer area and the capacity of the video buffer area, times of buffering requests can be reduced and network congestion can be avoided.

It should be noted that, in this article, the terms "including", "comprising" or any other variants thereof are intended to cover non-exclusive inclusion, so that a process, method, article or device including a series of elements includes not only those elements, but also includes other elements not explicitly listed, or elements inherent to such a process, method, article, or device. Without more restrictions, an element limited by the sentence "including a . . . " does not exclude that there are other identical elements in the process, method, article, or device that includes the element.

The above-mentioned serial numbers of the embodiments of the present application are merely for description and do not represent the superiority or inferiority of the embodiments.

Through the description of the above embodiments, those skilled in the art can clearly understand that the methods in the above embodiments can be implemented by means of software plus a necessary universal hardware platform, and of course, also by hardware, but in many cases, the former is the better implementation.

The above are only some embodiments of the present application, and thus do not limit the scope of the present application, any equivalent structure or equivalent process transformation made by using the contents of the specification and drawings of the present application, or directly or indirectly used in other related technical fields are both included in the scope of protection of this application.

What is claimed is:
1. A method, comprising:
    obtaining a video data file and an audio data file of streaming media content to be played from a server, when the streaming media content is played using Dynamic Adaptive Streaming over HTTP (DASH);
    obtaining a video bitrate from the video data file, and obtaining an audio bitrate from the audio data file;

determining a capacity of a video buffer area and a capacity of an audio buffer area according to the video bitrate and the audio bitrate; and in a process of playing the streaming media content, whenever a second preset number of video frames are played, doubling the capacity of the video buffer area until the capacity of the video buffer area reaches to be half of a preset total capacity of the maximum buffering; and whenever a second preset number of audio frames are played, doubling the capacity of the audio buffer area until the capacity of the audio buffer area reaches to be half of the preset total capacity of the maximum buffering.

2. The method of claim 1, wherein determining the capacity of the video buffer area and the capacity of the audio buffer area further comprises:

calculating a first capacity required to play a first preset number of video frames according to the video bitrate, and selecting the first capacity as the capacity of the video buffer area; and calculating a second capacity required to play the first preset number of audio frames according to the audio bitrate, and selecting the second capacity as the capacity of the audio buffer area.

3. The method of claim 1, wherein determining the capacity of the video buffer area and the capacity of the audio buffer area further comprises:

determining a proportion of audio and video bitrate according to the video bitrate and the audio bitrate; and dividing a preset total capacity of initial buffering into the capacity of the video buffer area and the capacity of the audio buffer area according to the proportion of audio and video bitrate.

4. The method of claim 1, further comprising, after determining the capacity of the video buffer area and the capacity of the audio buffer area:

obtaining an initial frame of the video data file in the streaming media content, and buffering the initial frame of the video data file in the video buffer area; and obtaining an initial frame of the audio data file in the streaming media content, and buffering the initial frame of the audio data file in the audio buffer area.

5. The method of claim 1, wherein the capacity of the video buffer area is larger than the capacity of the audio buffer area.

6. A computing device, comprising:

one or more processors; and one or more non-transitory computer-readable storage mediums containing instructions configured to cause the one or more processors to perform operations including:

obtaining a video data file and an audio data file of streaming media content to be played from a server, when the streaming media content is played using Dynamic Adaptive Streaming over HTTP (DASH);

obtaining a video bitrate from the video data file, and obtaining an audio bitrate from the audio data file;

determining a capacity of a video buffer area and a capacity of an audio buffer area according to the video bitrate and the audio bitrate; and in a process of playing the streaming media content, whenever a second preset number of video frames are played, doubling the capacity of the video buffer area until the capacity of the video buffer area reaches to be half of a preset total capacity of the maximum buffering; and whenever a second preset number of audio frames are played, doubling the capacity of the audio buffer area until the capacity of the audio buffer area reaches to be half of the preset total capacity of the maximum buffering.

7. The computing device of claim 6, wherein determining the capacity of the video buffer area and the capacity of the audio buffer area further comprises:

calculating a first capacity required to play a first preset number of video frames according to the video bitrate, and selecting the first capacity as the capacity of the video buffer area; and calculating a second capacity required to play the first preset number of audio frames according to the audio bitrate, and selecting the second capacity as the capacity of the audio buffer area.

8. The computing device of claim 6, wherein determining the capacity of the video buffer area and the capacity of the audio buffer area further comprises:

determining a proportion of audio and video bitrate according to the video bitrate and the audio bitrate; and dividing a preset total capacity of initial buffering into the capacity of the video buffer area and the capacity of the audio buffer area according to the proportion of audio and video bitrate.

9. The computing device of claim 6, wherein the one or more programs further comprises instructions for, after determining the capacity of the video buffer area and the capacity of the audio buffer area:

obtaining an initial frame of the video data file in the streaming media content, and buffering the initial frame of the video data file in the video buffer area; and obtaining an initial frame of the audio data file in the streaming media content, and buffering the initial frame of the audio data file in the audio buffer area.

10. The computing device of claim 6, wherein the capacity of the video buffer area is larger than the capacity of the audio buffer area.

11. A non-transitory computer-program product tangibly embodied in a machine-readable non-transitory storage medium that includes instructions configured to cause one or more processors to:

obtain a video data file and an audio data file of streaming media content to be played from a server, when the streaming media content is played using Dynamic Adaptive Streaming over HTTP (DASH);

obtain a video bitrate from the video data file, and obtain an audio bitrate from the audio data file;

determine a capacity of a video buffer area and a capacity of an audio buffer area according to the video bitrate and the audio bitrate; and in a process of playing the streaming media content, whenever a second preset number of video frames are played, doubling the capacity of the video buffer area until the capacity of the video buffer area reaches to be half of a preset total capacity of the maximum buffering; and whenever a second preset number of audio frames are played, doubling the capacity of the audio buffer area until the capacity of the audio buffer area reaches to be half of the preset total capacity of the maximum buffering.

12. The non-transitory computer-program product of claim 11, wherein determining the capacity of the video buffer area and the capacity of the audio buffer area further comprises:

calculating a first capacity required to play a first preset number of video frames according to the video bitrate, and selecting the first capacity as the capacity of the video buffer area; and calculating a second capacity required to play the first preset number of audio frames according to the audio bitrate, and selecting the second capacity as the capacity of the audio buffer area.

13. The non-transitory computer-program product of claim 11, wherein determining the capacity of the video buffer area and the capacity of the audio buffer area further comprises:
determining a proportion of audio and video bitrate according to the video bitrate and the audio bitrate, and dividing a preset total capacity of initial buffering into the capacity of the video buffer area and the capacity of the audio buffer area according to the proportion of audio and video bitrate.

14. The non-transitory computer-program product of claim 13, further comprising instructions causing the one or more processors to, after determining the capacity of the video buffer area and the capacity of the audio buffer area:
obtaining an initial frame of the video data file in the streaming media content, and buffering the initial frame of the video data file in the video buffer area; and
obtaining an initial frame of the audio data file in the streaming media content, and buffering the initial frame of the audio data file in the audio buffer area.

* * * * *